(12) United States Patent
Casto et al.

(10) Patent No.: US 9,061,483 B2
(45) Date of Patent: Jun. 23, 2015

(54) ADVANCED CARD MERGE MACHINE

(71) Applicant: FIRST DATA CORPORATION, Greenwood Village, CO (US)

(72) Inventors: Fred C. Casto, Omaha, NE (US); Jon A. Gates, Honey Creek, IA (US); Jeffery G. Nowlin, Council Bluffs, IA (US); Corey D. Tunink, La Vista, NE (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 14/252,316

(22) Filed: Apr. 14, 2014

(65) Prior Publication Data

US 2014/0306006 A1    Oct. 16, 2014

Related U.S. Application Data

(63) Continuation of application No. 12/715,648, filed on Mar. 2, 2010, now Pat. No. 8,763,898.

(51) Int. Cl.
*G06K 7/00* (2006.01)
*B32B 37/00* (2006.01)
*B32B 37/02* (2006.01)
*G06K 5/00* (2006.01)

(52) U.S. Cl.
CPC ....... *B32B 37/0046* (2013.01); *Y10T 156/1049* (2015.01); *Y10T 156/10* (2015.01); *Y10T 156/1798* (2015.01); *Y10T 156/1746* (2015.01); *B32B 37/02* (2013.01); *G06K 7/00* (2013.01); *G06K 5/00* (2013.01)

(58) Field of Classification Search
USPC .............................. 235/375, 380, 381; 705/5
See application file for complete search history.

(56) References Cited

U.S. PATENT DOCUMENTS

| | | | |
|---|---|---|---|
| 4,384,196 A | 5/1983 | McCumber et al. | |
| 7,426,424 B2 | 9/2008 | Moriguchi | |
| 7,463,946 B2 | 12/2008 | Smith et al. | |
| 7,534,476 B2 | 5/2009 | Banks et al. | |
| 7,874,493 B2 | 1/2011 | Armijo et al. | |
| 8,763,898 B2 * | 7/2014 | Casto et al. | 235/380 |
| 2003/0121986 A1 | 7/2003 | Stromberg et al. | |
| 2007/0281846 A1 | 12/2007 | Neubauer et al. | |
| 2008/0257966 A1 | 10/2008 | Britt et al. | |

OTHER PUBLICATIONS

Final Office Action for U.S. Appl. No. 12/715,648 mailed Jul. 2, 2012.

(Continued)

*Primary Examiner* — Matthew Mikels
(74) *Attorney, Agent, or Firm* — Sutherland Asbill & Brennan LLP (57) ABSTRACT

Advanced card machines and associated card merge methods are provided. A form may be provided from a first supply of forms to a first track that is configured to advance the form. A foldable payment card may be selected from a second supply of foldable payment cards, wherein the selection of the payment card does not result in the payment card being folded. The selected payment card may be advanced, without folding the payment card, along a second track to a position in which the payment card is supplied to the form Additionally, an adhesive may be applied to one of the form or the payment card, and the adhesive may attach the payment card to the form when the payment card is supplied to the form.

8 Claims, 7 Drawing Sheets

(56) References Cited

OTHER PUBLICATIONS

Non-final Office Action for U.S. Appl. No. 12/715,648 mailed Jan. 23, 2012, US.
Non-final Office Action for U.S. Appl. No. 12/715,648 mailed Jun. 28, 2013.
Final Office Action for U.S. Appl. No. 12/715,648 mailed Oct. 31, 2013.
Notice of Allowance for U.S. Appl. No. 12/715,648 mailed Jan. 13, 2014.
Non-final Office Action response for U.S. Appl. No. 12/715,648 mailed Apr. 23, 2012.
Final Office Action response for U.S. Appl. No. 12/715,648 mailed Sep. 4, 2012.
Advisory Action for U.S. Appl. No. 12/715,648 mailed Sep. 11, 2012.
Advisory Action response for U.S. Appl. No. 12/715,648 mailed Oct. 2, 2012.
Non-final Office Action response for U.S. Appl. No. 12/715,648 mailed Sep. 30, 2013.
Final Office Action response for U.S. Appl. No. 12/715,648 mailed Dec. 31, 2013.

* cited by examiner

ADVANCED CARD MERGE MACHINE

CROSS-REFERENCE TO RELATED APPLICATIONS

This application claims priority to U.S. application Ser. No. 12/715,648, entitled "Advanced Card Merge Machine," filed on Mar. 2, 2010, the contents of which are incorporated by reference herein in their entirety.

TECHNICAL FIELD

Embodiments of the disclosure relate generally to payment card merge machines, and more specifically to payment card merge machines and associated merge methods that may be utilized with foldable payment cards.

BACKGROUND

Payment cards, such as credit cards, debit cards, gift cards, etc., have become a very popular means of making purchases. In many instances, initial payment cards and replacement cards are mailed to a consumer. To facilitate mailing, a payment card is typically attached or adhered to a paper mailer form that includes information associated with the payment card. Conventional merge machines typically receive a payment card and a form and attach the payment card to the form. However, conventional merge machines are typically not configured to receive forms of varying sizes and types, such as both paper forms and post cards. Additionally, conventional merge machines are not configured to operate on foldable payment cards, such as the Butterfly™ cards issued by the American Express Company. Conventional merge machines often cause foldable cards to be folded as they are processed by the machine, thereby leading to the machines jamming or potentially being damaged.

Accordingly, a need exists for improved payment card merge machines and methods for merging payment cards. A need also exists for improved payment card merge machines and associated methods that may be utilized with foldable payment cards.

BRIEF DESCRIPTION

Some or all of the above needs and/or problems may be addressed by certain embodiments of the disclosure. Embodiments of the advanced payment card merge machines and associated methods for merging payment cards and forms. According to one embodiment of the disclosure, there is disclosed a payment card merge machine. The payment card merge machine may include a first feeder, a first track, an applicator, a second feeder, a second track, and a controller. The first feeder may be configured to receive a first supply of forms and to provide a form from the first supply to the first track, and the first track may be configured to advance the form. The second feeder may be configured to receive a second supply of foldable payment cards and select a payment card from the second supply without the payment card being folded. The second track may be configured to receive the payment card from the second feeder and advance the payment card, without folding the payment card, to a position in which the payment card is supplied to the form. The applicator may be configured to apply an adhesive to one of the forms as it is advanced along the first track or the payment card as it is advanced along the second track. The applied adhesive may attach the payment card to the form once the payment card is provided to the form. The controller may be configured to control the advancement of the first track and the second track.

According to another embodiment of the disclosure, there is disclosed a method for merging forms and payment cards. A form may be provided from a first supply of forms to a first track that is configured to advance the form. A foldable payment card may be selected from a second supply of foldable payment cards, wherein the selection of the payment card does not result in the payment card being folded. The selected payment card may be advanced, without folding the payment card, along a second track to a position in which the payment card is supplied to the form. An adhesive may be applied to one of the forms as it is advanced along the first track or the payment card as it is advanced along the second track. The adhesive may attach the payment card to the form once the payment card is supplied to the form. In certain embodiments, the advancement of the first track and the second track may be controlled by at least one computer.

According to yet another embodiment of the disclosure, there is disclosed a method for merging forms and payment cards. A form may be advanced along a first track. A foldable payment card may be selected from a supply of foldable payment cards, wherein the selection of the payment card does not result in the payment card being folded. The selected payment card may be advanced along a second track without folding the payment card, and the payment card may be provided, via the second track, to the form as the form is advanced along the first track. An adhesive may be applied to one of the form as the form is advanced along the first track or the payment card as the payment card is advanced along the second track. In certain embodiments, the advancement of the first track and the second track may be controlled by at least one computer.

Additional systems, methods, apparatus, features, and aspects are realized through the techniques of various embodiments of the disclosure. Other embodiments and aspects of the disclosure are described in detail herein and are considered a part of the claimed disclosure. Other embodiments and aspects can be understood with reference to the description and the drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Illustrative embodiments of the disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Disclosed are advanced payment card merge machines and associated methods for merging payment cards and forms. During operation of an advanced merge machine, a first supply of forms may be provided, and a form may be selected from the first supply and provided to a first track. The first track may be configured to advance the form through other components of the advanced merge machine. A second supply of foldable payment cards may also be provided. A foldable payment card may be selected or picked from the second supply without resulting in the foldable payment card being folded or collapsed. For example, a card may be selected by applying pressure to the foldable payment card in a direction that is transverse to that of the fold. Once selected, the payment card may be advanced along a second track without the payment card being folded. The payment card may be advanced along the second track to a position in which the payment card is supplied to the form that is being advanced along the first track. An adhesive, such as a double-sided tape, may be applied by a suitable applicator to at least one of the form as it is advanced along the first track or the payment card as it is advanced along the second track. In certain embodiments, the payment card and the form may be attached by the applied adhesive once the payment card is supplied to the form. As desired, the advancement or movement of the first track and the second track may be controlled by at least one computer. Additionally, the advancement of the first track and the advancement of the second track may be synchronized or coordinated.

Various embodiments of the disclosure may include one or more special purpose computers, systems, and/or particular machines that facilitate the control and/or operation of a card merge machine. A special purpose computer or particular machine may include a wide variety of different software modules as desired in various embodiments. As explained in greater detail below, in certain embodiments, these various software components may be utilized to dynamically control the operations of a card merge machine.

Certain embodiments of the disclosure described herein may have the technical effect of merging foldable payment cards and forms. In this regard, a payment card mailer may be produced. Additionally, certain embodiments of the disclosure may have the technical effect of merging foldable payment cards and forms without folding the payment cards.

Figure 1:
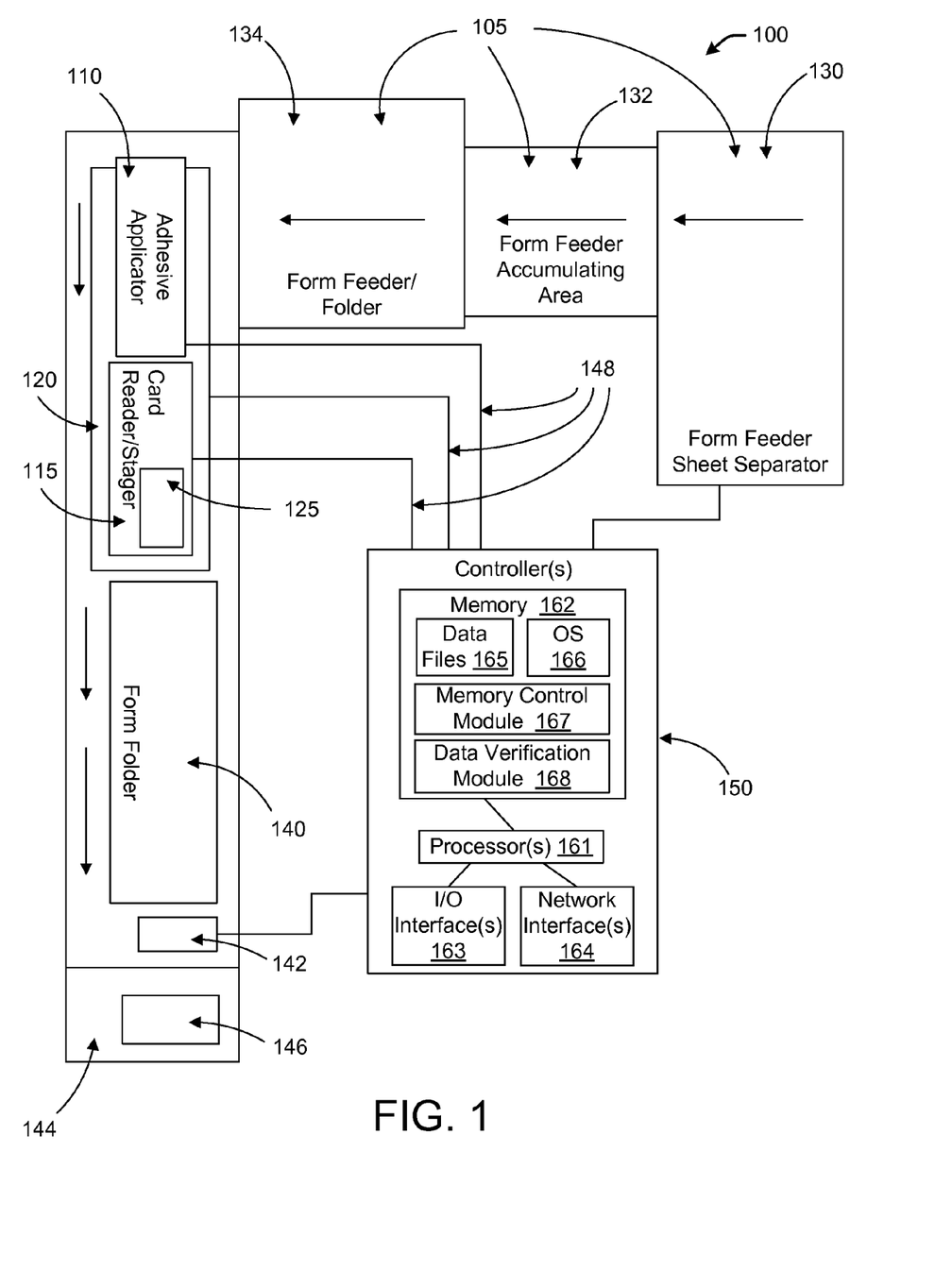
FIG. 1 is a block diagram of one example payment card merge machine, according to an illustrative embodiment of the disclosure.

FIG. 1 is a block diagram of one example payment card merge machine 100, according to an illustrative embodiment of the disclosure. The machine 100 may be configured to merge payment cards, such as credit cards, debit cards, etc., with forms, such as pre-printed mailing forms. The machine 100 illustrated in FIG. 1 may include a form feeder 105, an adhesive applicator 110, and/or a card staging component 115. Additionally, the machine 100 may include a first track 120 and a second track 125.

The form feeder 105 may be configured to receive a supply of forms and provide a form to the first track 120 for further processing by other components of the machine 100. For example, a stack or other supply of paper forms or post cards may be received by the form feeder 105. Individual or single forms may be pulled from the stack and further processed by the form feeder 105. One or more processed forms may then be supplied by the form feeder 105 to the first track 120.

The form feeder 105 may include any number of components as desired in various embodiments of the disclosure. For example, the form feeder 105 may include a sheet separator 130, an accumulating area 132, and/or a form folder 134. A sheet separator 130 may separate or pull one form (e.g., sheet or card) from a supply of forms. Additionally, as desired, the sheet separator 130 may include one or more suitable reader devices, such as a suitable bar code scanner or optical reader device, that are configured to scan or read information that is preprinted on the form, such as a bar code that includes payment account information for a payment account associated with the form. In certain embodiments, at least a portion of the information read from the form may be communicated to a suitable controller, such as the controller 150 discussed in greater detail below.

A wide variety of different types of sheet separators 130 may be utilized as desired in various embodiments of the disclosure, including but not limited to, a cut sheet feeder and/or a stream feeder. In certain embodiments, the type of sheet separator 130 that is utilized may be determined based at least in part upon a type of form that is supplied to the form feeder 105. For example, a cut sheet feeder may be utilized in association with paper forms and a stream feeder may be utilized in association with post card forms. As desired, multiple sheet separators may be provided. Additionally, two or more sheet separators may be interchangeable in certain embodiments of the disclosure.

A wide variety of different types of forms may be supplied to the feeder 105 and/or the sheet separator 130 as desired in various embodiments of the disclosure. Suitable types of forms include, but are not limited to, paper forms, post cards, index cards, etc. Supplied forms may include a wide variety of different dimensions and/or sizes as desired. For example, various sizes of paper forms or various sizes of index cards may be supplied.

The accumulating area 132 may facilitate the accumulation or gathering of multiple forms or multiple pages prior to providing the accumulated forms to first track 120. For example, a first form that includes bar code information and or payment information and other forms that include additional information associated with a payment card (e.g., account activation information, terms and conditions associated with an account, etc.) may be accumulated together within the accumulating area 132. Any number of forms may be accumulated as desired in various embodiments of the disclosure. As desired, the accumulating area 132 may be utilized to accumulate different types of forms and/or forms that include different dimensions. If multiple forms are not desired for a particular merge activity, then the accumulating area 132 may pass a single form along to another component of the machine 100.

The form folder 134 or folding area may be configured to perform one or more folds on a form or on multiple forms prior to providing the form(s) to the first track 120. Any number of folds may be performed as desired in various embodiments of the disclosure. Additionally, folds may be performed in any desired direction. A wide variety of different types of folding devices may be incorporated into the form folder 134, including but not limited to, one or more buckle folders, one or more knife folders, one or more plow folders, one or more paper folders, one or more pneumatic folding machines, and/or any combination of folding devices. In one example embodiment, the form folder 134 may include a suitable buckle folder. If no folds are desired, then the form folder 134 may pass a form or accumulated forms along to another component of the machine 100.

According to an aspect of the disclosure, the form feeder 105 may provide a form, which may be a single or accumulated form, to the first track 120. In this regard, a payment card may be merged or attached to the form. The form feeder 105 that is described above is provided by way of example only and it will be appreciated that a wide variety of suitable form feeders may be utilized as desired in various embodiments of the disclosure. One example of a suitable form feeder is described in U.S. Pat. No. 7,516,949, which is incorporated by reference herein in its entirety.

The first track 120 may be configured to receive a form from the form feeder 105 and advance the received form through other components of the machine 100. Once a payment card has been attached to the form, the first track 120 may facilitate the advancement of the form and the payment card. In certain embodiments, the first track 120 may include any number of rollers, such as pinch rollers or other suitable rollers, that facilitate the advancement of the form. The rollers may be controlled by one or more suitable motors, such as one or more suitable servo motors. In this regard, the components of the first track 120 may be relatively stationary components that facilitate the advancement of the form. In other embodiments, the first track 120 may include at least one suitable transport belt on which the form may rest as it is advanced. The transport belt may then be moved by one or more pulleys, conveyors, and/or motors. In yet other embodiments, the first track 120 may include a combination of belts and rollers.

In certain embodiments, the advancement of the form along the first track 120 may be facilitated by any number of motors and/or pulleys associated with the first track 120. For example, a plurality of motors may control the rotation of one or more belts and/or a plurality of rollers associated with the first track 120. A wide variety of suitable types of motors may be utilized as desired in various embodiments of the disclosure, including but not limited to, servo motors, direct current electric motors, alternating current electric motors, synchronous electric motors, induction motors, and/or a combination of multiple types of motors. In certain embodiments, a plurality of servo motors may be utilized to control the first track 120 and/or certain operations of other components of the machine 100, such as the adhesive applicator 110, the card staging component 115, etc. As desired, the motors may be controlled by and/or synchronized by at least one controller, such as the controller 150 described below. For example, the motors may be electronically geared together. In certain embodiments, each motor may include control logic and/or software that facilitates the operation of the motor and/or the synchronization of the motors.

The adhesive applicator 110 may be configured to apply an adhesive to a form that is advanced along the first track 120. For example, the adhesive applicator 110 may be positioned above the first track 120, and an adhesive may be applied or otherwise supplied to a form moving below the adhesive applicator 110. The applied adhesive may facilitate the attachment of a payment card to the form. A wide variety of different types of adhesives may be applied to a form as desired in various embodiments of the disclosure including, but not limited to, a double-sided tape, a liquid adhesive, glue, etc. Additionally, an adhesive may be applied to any number of a wide variety of different areas or sections of a form as desired in various embodiments of the disclosure. In one example embodiment, the adhesive applicator 110 may be a suitable tape applicator that is configured to apply a double-sided tape to a form that is advanced along the first track 120. One example of a suitable adhesive applicator 110 is described in greater detail below with reference to FIG. 2.

As an alternative to applying an adhesive to a form that is advanced along a first track 120 positioned below an adhesive applicator 110, in certain embodiments, the adhesive applicator 110 may receive a form and process the form in order to provide an adhesive to the form. The form may then be supplied to another component of the machine 100, such as to the first track 120 or to a component that is configured to attach a payment card to the form.

Alternatively, in certain embodiments, a suitable adhesive applicator may be configured to apply an adhesive, such as a double-sided tape, to a payment card prior to the payment card being supplied to a form. An adhesive applicator that applies an adhesive to a payment card may operate in a similar manner as the adhesive applicator described above for a form. Additionally, in certain embodiments, an adhesive may be applied to both a form and a payment card.

The card staging component 115 may be configured to receive a supply of payment cards and select a payment card for provision to a form that is advanced along the first track 120. In certain embodiments, a stack of payment cards may be supplied to the card staging component 115. Individual or single payment cards may be pulled from the stack and further processed by the card staging component 115. Account data and/or other data included on or recorded on the payment card may be read or scanned by one or more suitable reader devices, such as a magnetic stripe reader, radio frequency (RF) reader, optical reader device, etc. In this regard, at least a portion of the information stored on the payment card may be compared to information included on the form and a determination may be made as to whether the payment card and the form match. After information or data is read from the payment card, the payment card may then be provided or supplied to a corresponding form that is being advanced along the first track 120.

A wide variety of different types of payment cards may be received by the card staging component 115, including but not limited to, credit cards, debit cards, gift cards, stored valued, cards, etc. According to an aspect of the disclosure, the card staging component 115 may be configured to receive a supply of foldable payment cards. A foldable payment card may be configured to fold or collapse in at least one direction. For example, a foldable payment card may include a fold that extends approximately through the center of the card in a lengthwise direction or in a direction corresponding to an elongated edge of the payment card. In this regard, the payment card may be folded for relatively easy storage and/or portability, such as storage in a relatively small container that may be attached to a key chain. One example of a suitable foldable payment card is the Butterfly Card that is offered by the American Express Company™. According to an aspect of the invention, the card staging component 115 and other components of the machine 100 may be configured to provide a foldable payment card to a form without folding or collapsing the payment card.

The card staging component 115 may include a wide variety of different components as desired in various embodiments of the disclosure. In one example embodiment, the card staging component 115 may include a card picker, a card reader, and/or a second track 125. A card picker or card picker component may be configured to receive a supply of payment cards, such as foldable payment cards. For example, the card picker may be configured to receive a stack or other supply of payment cards. In certain embodiments, the card picker may include one or more suitable sleeves or guides that facilitate the receipt of a stack of payment cards.

The card picker may further be configured to select or pick a single payment card, such as a bottom card on the stack, from the supply and provide the payment card to another component of the card staging component 115, such as the second track 125. According to an aspect of the disclosure, the card picker may select a single foldable payment card without folding the payment card. For example, in certain embodiments, the card picker may include a cam or other suitable device that is configured to pull or otherwise select a single payment card from the supply and provide the payment card to the second track 125. The cam may be operable to flex the payment card in a direction other than the direction of the fold included on the payment card. For example, the payment card may be flexed in a direction that is transverse to the direction of the fold. In this regard, the payment card may be forced under a suitable roller that pulls the payment card onto and/or along the second track 125. One example card picker and its operation are described in greater detail below with reference to FIGS. 3 and 4.

The card reader may include one or more suitable reader devices and/or sensor devices that are configured to read or otherwise extract data and/or other information from a payment card. For example, the card reader may include one or more magnetic stripe readers, radio frequency (RF) readers, etc. that are configured to read payment account information from the payment card. As desired, information that is read from a payment card may be communicated to a controller, such as the controller 150 described in greater detail below. In certain embodiments, the card reader may read information from the payment card as the card is advanced along the second track 125. For example, a payment card may rest on the second track 125 and be directed through a card reader by one or more rollers.

The second track 125 may be configured to receive a payment card from the card picker and advance the payment card through the card staging component 115. Additionally, the second track 125 may be configured to supply or provide the payment card to a corresponding form that is being advanced along the first track 120. The components of the second track 125 may be similar to those of the first track 120. For example, the second track 125 may include one or more rollers, such as pinch rollers or other rollers, that are configured to advance a payment card along the track 125. The rollers may be controlled by one or more suitable motors, such as one or more suitable servo motors. In this regard, the components of the second track 125 may be relatively stationary components that facilitate the advancement of the payment card. In other embodiments, the second track 125 may include at least one suitable transport belt on which the payment card may rest as it is advanced. The transport belt may then be moved by one or more pulleys, conveyors, and/or motors.

In certain embodiments, the advancement of the payment card along the second track 125 may be facilitated by any number of motors associated with the second track 125. For example, a plurality of motors may control the rotation of a plurality of rollers associated with the second track 125. A wide variety of suitable types of motors may be utilized as desired in various embodiments of the disclosure, including but not limited to, servo motors, direct current electric motors, alternating current electric motors, synchronous electric motors, induction motors, and/or a combination of multiple types of motors. In certain embodiments, a plurality of servo motors may be utilized to control the second track 125. As desired, the motors may be controlled by and or synchronized by at least one controller, such as the controller 150 described below.

According to an aspect of the disclosure, the payment card may be advanced along the second track 125 without folding the payment card. Additionally, at least a portion of the second track 125 may be positioned above the first track 120, and the second track 125 may include an inclined section or inclined portion that is configured to provide a payment card from the second track 125 to a corresponding form positioned on the first track 120. For example, the second track 125 may advance a payment card off of an edge of the inclined portion such that the payment card makes contact with the adhesive that has been applied to a corresponding form. The payment card may then be pressed into the adhesive by one or more rollers associated with the first track 120, thereby facilitating a bond or connection. One example second track 125 is described in greater detail below with reference to FIGS. 3 and 4.

As an alternative to supplying a payment card to the first track 120 positioned below a second track 125 of the card staging component 115, in certain embodiments, the card staging component 115 may receive a form that has an adhesive, and the card staging component 115 may provide a payment card to the form such that the card is attached to the form via the adhesive. The form and attached payment card may then be supplied to another component of the machine 100, such as to the first track 120 or to a component that is configured to fold the form and/or stuff the form into one or more envelopes.

In certain embodiments, a positioning of the adhesive applicator 110 and/or the card staging component 115 may be variable or adjustable in a lateral direction. For example, the adhesive applicator 110 and/or the card staging component 115 may be mounted on one or more rails or brackets, and the adhesive applicator 110 and/or card staging component 115 may be shifted along the rails. In this regard, the lateral positioning of an adhesive and a payment card that is provided to a form may be adjusted. Additionally, the vertical positioning of an adhesive and a payment card that is provided to a form may be controlled by the advancement of the form along the first track 120.

In certain embodiments of the disclosure, once a payment card has been attached to a form, the form may be folded any number of times. For example, the machine 100 may include one or more form folders 140, such as plow folders, buckle folders, knife folders, pneumatic folding machines, and/or any combination of folding devices. In one example embodiment, the machine 100 may include a plow folder that is configured to fold the form following the attachment of the payment card. The folding of a form may facilitate the stuffing of the form into an envelope or mailer.

With continued reference to FIG. 1, the machine 100 may include one or more sensors 142 that are configured to determine whether a payment card has been attached to a form. A wide variety of suitable types of sensors may be utilized as desired, such as optical sensors. An optical sensor may scan a form and measure a thickness of the form. Based at least in part on the measured thickness, a determination may be made as to whether a payment card has been attached to the form. In certain embodiments, the determination may be made by suitable circuitry, controllers, and/or control logic associated with the optical sensor. In other embodiments, the determination may be made by one or more controllers in communication with the optical sensor, such as the controller 150 described in greater detail below.

The machine 100 may additionally include an output component 144 that is configured to collect forms to which payment cards have been attached. A wide variety of suitable output components 144 may be utilized, such as a collection bin. In certain embodiments, the output component 144 may include a divert bin 146 or divert component, and problem forms may be diverted, directed, or routed to the divert bin 146. For example, forms that do not include a payment card and/or forms that include payment account information that does not match payment account information for an attached card may be diverted or directed to the divert bin 146. In this regard, certain quality control may be performed by the machine 100.

The machine 100 may further include at least one controller 150 or suitable control system. The controller 150 may be configured, programmed, or operable to control the operation of one or more other components of the machine 100, such as the motors associated with the first track 120, the second track 125, and/or other components. Additionally, in certain embodiments, the controller 150 may be configured, programmed, or operable to analyze and/or otherwise process information, data, and/or measurements, received from other components of the machine 100. For example, the controller 150 may be configured to determine whether payment account information read from a form matches or otherwise corresponds to payment account information read from a payment card. As another example, the controller 150 may be configured to determine whether a payment card has been attached to a form utilizing measurements data received from an optical sensor 142. As shown in FIG. 1, a plurality of connections 148 may facilitate communications between the controller 150 and any number of other components of the machine 100. A wide variety of different types of suitable connections may be utilized to facilitate communication, for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

With continued reference to FIG. 1, the controller 150 may be a suitable processor driven device that is capable of controlling the operation of the machine 100. Examples of suitable controllers include, but are not limited to, application specific circuits, microcontrollers, minicomputers, personal computers, servers, other computing devices and the like. The controller 150 may include any number of processors 161 that facilitate the execution of computer-readable instructions to control the operations of the controller 150. By executing computer-readable instructions associated with controlling certain operations of the machine 100, the controller 150 may form a special purpose computer or special purpose machine that controls the merging of a payment card to a form.

In addition to one or more processor(s) 161 the controller 150 may include one or more memory devices 162, one or more input/output ("I/O") interfaces 163, and one or more network interfaces 164. The one or more memory devices 162 or memories may be any suitable memory devices for example, caches, read only memory devices, random access memory devices, magnetic storage devices, etc. The one or more memory devices 162 may store data, executable instructions, and/or various program modules utilized by the controller 150, for example, data files 165, an operating system 166, a memory control module 167 or motor control application and/or a data verification module 168 or data control application. The data files 165 may include stored data associated with the operation of the machine 100, stored data associated with information read by one or more reader devices, stored measurements data received from the various sensors, and/or stored data associated with a determination made by the controller 150.

In certain embodiments of the disclosure, the controller 150 may include any number of software applications that are executed to facilitate the operations of the controller 150. The software applications may include computer-readable instructions that are executable by the one or more processors 161. The execution of the computer-readable instructions may form a special purpose computer that facilitates the merging of payment cards and forms. As an example of a software application, the controller 150 may include an operating system ("OS") 166 that controls the general operation of the controller 150 and that facilitates the execution of additional software applications. The controller 150 may also include a memory control module 167 that is programmed, configured, or operable to control, coordinate, and/or synchronize the operation of one or more motors, such as servo motors, associated with the machine 100. The memory control module 167 may be in communication with any number of motors incorporated into other components of the machine 100, including but not limited to the adhesive applicator 110, the card staging component 115, the first track 120, and the second track 125. The memory control module 167 may monitor and control the operations of each of the motors as any number of forms and payment cards are advanced through the machine 100. In this regard, the advancement of the forms and cards may be synchronized or coordinated.

Additionally, the controller 150 may include a data verification module 168 that is programmed, configured, or operable to verify payment account information for merged forms and payment cards. The data verification module 168 may receive, from the form feeder 105 or another component of the machine 100, payment account information read from a form. Additionally, the data verification module 168 may receive, from the card staging component 115 or another component of the machine 100, payment account information read from a corresponding payment card that will be supplied to the form. The data verification module 168 may determine whether the information for the form matches or corresponds to the information for the payment card. In this regard, the data verification module 168 may determine whether a payment card matches a form to which the payment card is attached. If the data verification module 168 determines that a payment card and form do not match, then the data verification module 168 may take a suitable control action, such as directing the form to the divert bin 146 or shutting off the machine 100.

The one or more I/O interfaces 163 may facilitate communication between the controller 150 and one or more input/output devices, for example, a universal serial bus port, a serial port, a disk drive, a CD-ROM drive, and/or one or more user interface devices, such as, a display, keyboard, keypad, mouse, control panel, touch screen display, microphone, etc. that facilitate user interaction with the controller 150. The one or more I/O interfaces 163 may be utilized to receive or collect data and/or user instructions from a wide variety of input devices. Received data may be processed by the controller 150 as desired in various embodiments of the disclosure and/or stored in the one or more memory devices 162.

The one or more network interfaces 164 may facilitate connection of the controller 150 to one or more suitable networks and/or connections, for example, the connections 148 that facilitate communications with other components of the machine 100. In this regard, the controller 150 may receive data from one or more sensors or readers and/or communicate data and/or commands to other components of the machine 100. The one or more network interfaces 164 may further facilitate connection of the controller 150 to one or more suitable networks, for example, a local area network, a wide area network, the Internet, a cellular network, a radio frequency network, a Bluetooth™ enabled network (trademark owned by BLUETOOTH SIG, INC.), a Wi-Fi™ enabled network (trademark owned by Wi-Fi Alliance Corporation), any wired network, any wireless network, etc. for communication with external devices and/or systems.

According to an aspect of the disclosure, the machine 100 may include a relatively small footprint and/or relatively small dimensions. For example, the machine 100 may include a footprint of no more than approximately twelve feet by approximately six feet. In this regard, the machine 100 may be significantly smaller than conventional card merge machines. Additionally, in certain embodiments, the machine 100 may be configured such that it may be operated by a single individual or operator. For example, the machine 100 may be configured in a U-shape or an approximate U-shape, and the operator may stand in the middle of the U-shape. The operator may then easily supply forms and payment cards to the machine 100 and retrieve merged forms from the machine 100.

As desired, embodiments of the disclosure may include a machine 100 with more or less than the components illustrated in FIG. 1. The machine 100 of FIG. 1 is provided by way of example only. Indeed, the machine 100 may include any number of additional components as desired in various embodiments of the disclosure. For example, the machine 100 may include a component that is configured to stuff or position folded or unfolded forms into one or more envelopes that facilitate mailing of the forms.

Figure 2:
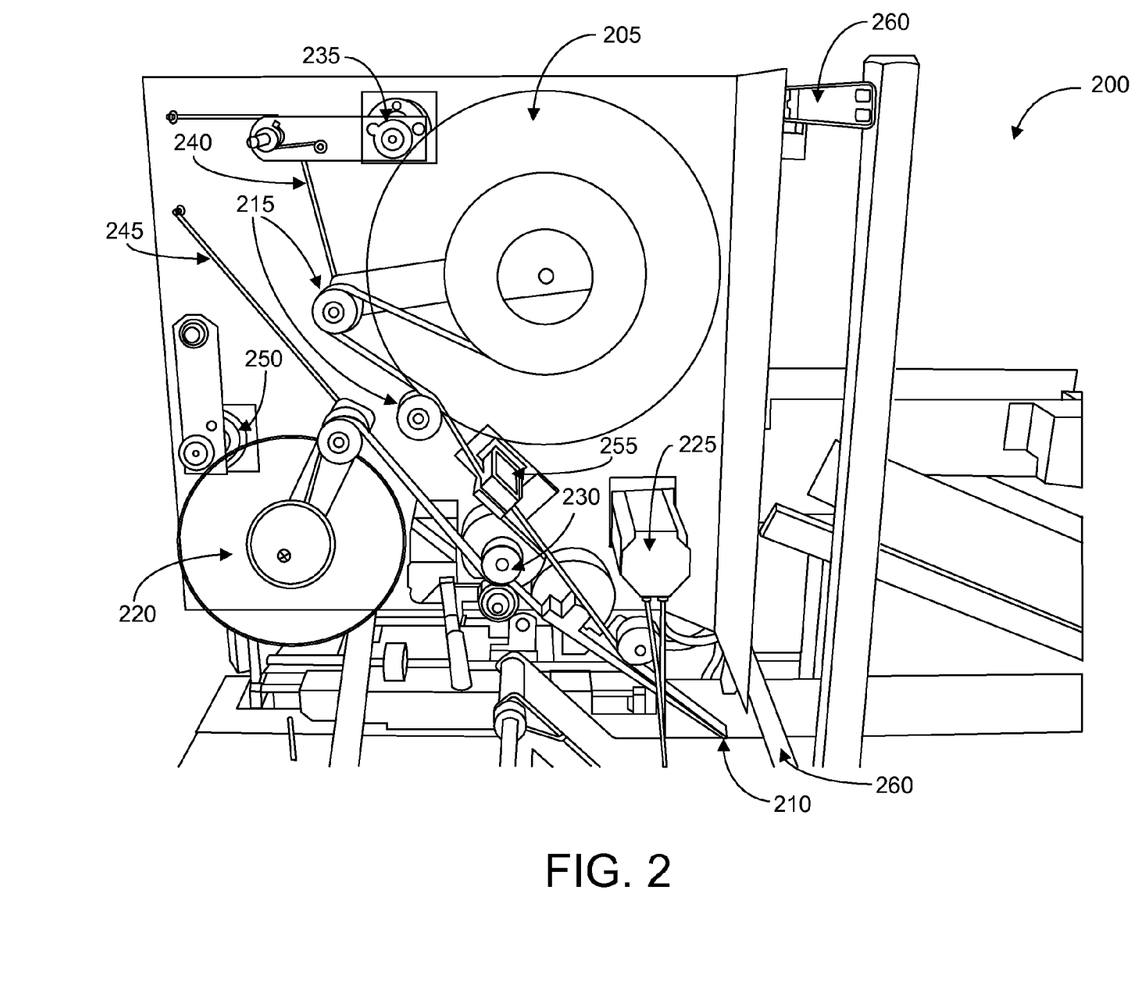
FIG. 2 is a front perspective view of an example adhesive applicator that may be utilized in accordance with various embodiments of the disclosure.

FIG. 2 is a front perspective view of an example adhesive applicator 200 that may be utilized in accordance with various embodiments of the disclosure. The illustrated adhesive applicator 200 may be incorporated into a suitable card merge machine, such as the machine 100 illustrated in FIG. 1. For example, the adhesive applicator 200 may be one example of the adhesive applicator 110 described above with reference to FIG. 1. The adhesive applicator 200 may be a suitable tape applicator that is configured to apply a double-sided tape to a form. The double-sided tape may then facilitate the attachment or merging of a payment card to the form.

With reference to FIG. 2, the adhesive applicator 200 may include a supply 205 of double-sided tape, such as one or more reels or spools of double-sided tape. Double-sided tape may be provided from the supply 205 to a knife component 210 via any number of rollers 215 or guides. When the double-sided tape is pulled around an edge of the knife component 210, the tension created by the relatively rapid change in direction may separate the tape from its backing, and the tape may be deposited on a form that is positioned below the knife component 210. For example, the tape may be deposited on a form that is positioned on a track below the knife component 210, such as the first track 120 illustrated in FIG. 1. The backing may then be provided to a collecting point 220, such as a collection reel or spool.

According to an aspect of the disclosure, the advancement of the double-sided tape through the adhesive applicator 200 may be controlled by one or more motors and/or rollers. For example, a suitable first motor 225, such as a servo motor, may control the operation of one or more rollers, such as one or more pinch rollers 230. The pinch roller 230 may pull the tape backing on the back side of the knife component 210, thereby maintaining a sufficient tension to separate the backing from the tape at an edge of the knife component 210. Additionally, as desired, a second motor 235, such as a second servo motor, may control the advancement or rotation of the tape supply 205. For example, the second motor 235 may periodically flex a first feed arm 240 or spring arm that is configured to rotate the tape supply 205. In this regard, a desired amount of slack may be provided for the tape that is pulled by the pinch roller 230, thereby reducing or eliminating an amount of work performed by the pinch roller 230 to rotate the tape supply 205. Once the backing is pulled through the pinch roller 230, the collection of the backing may depress a second feed arm 245. Once the second feed arm 245 reaches a desired point, a third motor 250 may rotate or turn the collecting point 220, thereby winding any loose backing onto a collection reel.

As desired, the first motor 225, second motor 235, and third motor 250 may be electronically geared together and/or synchronized. In this regard, the operations of the various components of the adhesive applicator 200 may be coordinated. Additionally, the motors 225, 235, 250 may be electronically geared to and/or synchronized with motors incorporated into other components of the machine 100, such as one or more motors that facilitate the advancement of a form along the first track 120. As desired, a suitable controller, such as the controller 150 illustrated in FIG. 1, may monitor the motors and facilitate the synchronization of the motors.

In certain embodiments, one or more sensors 255 may be provided that are configured to sense gaps between individual pieces of tape included in a supply of double-sided tape. In this regard, the advancement of the tape by the pinch roller 230 may be controlled in a relatively accurate manner such that a piece of tape will be provided to a desired location of a form. A wide variety of different sensors may be utilized in various embodiments of the disclosure, such as a suitable optical sensor. As desired, the measurements or determinations of the sensor 255 may be provided to the first motor 225 and/or to a controller 150 that is configured to control the operation of the pinch roller 230.

Additionally, as shown in FIG. 2, the adhesive applicator 200 may be mounted to one or more suitable brackets 260 that facilitate the adjustment of the adhesive applicator 200 in a lateral or side-to-side direction. For example, a position of the adhesive applicator 200 may be adjusted along the length of the brackets 260. In this regard, the positioning of a piece of tape supplied to a form that is advanced underneath the adhesive applicator 200 may be varied in a lateral direction. In certain embodiments, the brackets 260 may include slides or rails, and the positioning of the adhesive applicator 200 on the brackets 260 may be adjusted by sliding the adhesive applicator 200 along the slides. The adhesive applicator 200 may then be locked into place once a desired position is reached.

As desired, embodiments of the disclosure may include an adhesive applicator 200 with more or less than the components illustrated in FIG. 2. Additionally, an adhesive applicator with alternative components may be utilized in accordance with various embodiments of the disclosure. For example, an adhesive applicator that provides a liquid adhesive to a form may be utilized. As another example, an adhesive applicator that provides an adhesive to a payment card rather than to a form may be utilized. Additionally or alternatively, an adhesive applicator may be provided that is configured to apply an adhesive to a payment card prior to the payment card being supplied to a corresponding form. The adhesive applicator 200 of FIG. 2 is provided by way of example only.

Figure 3:
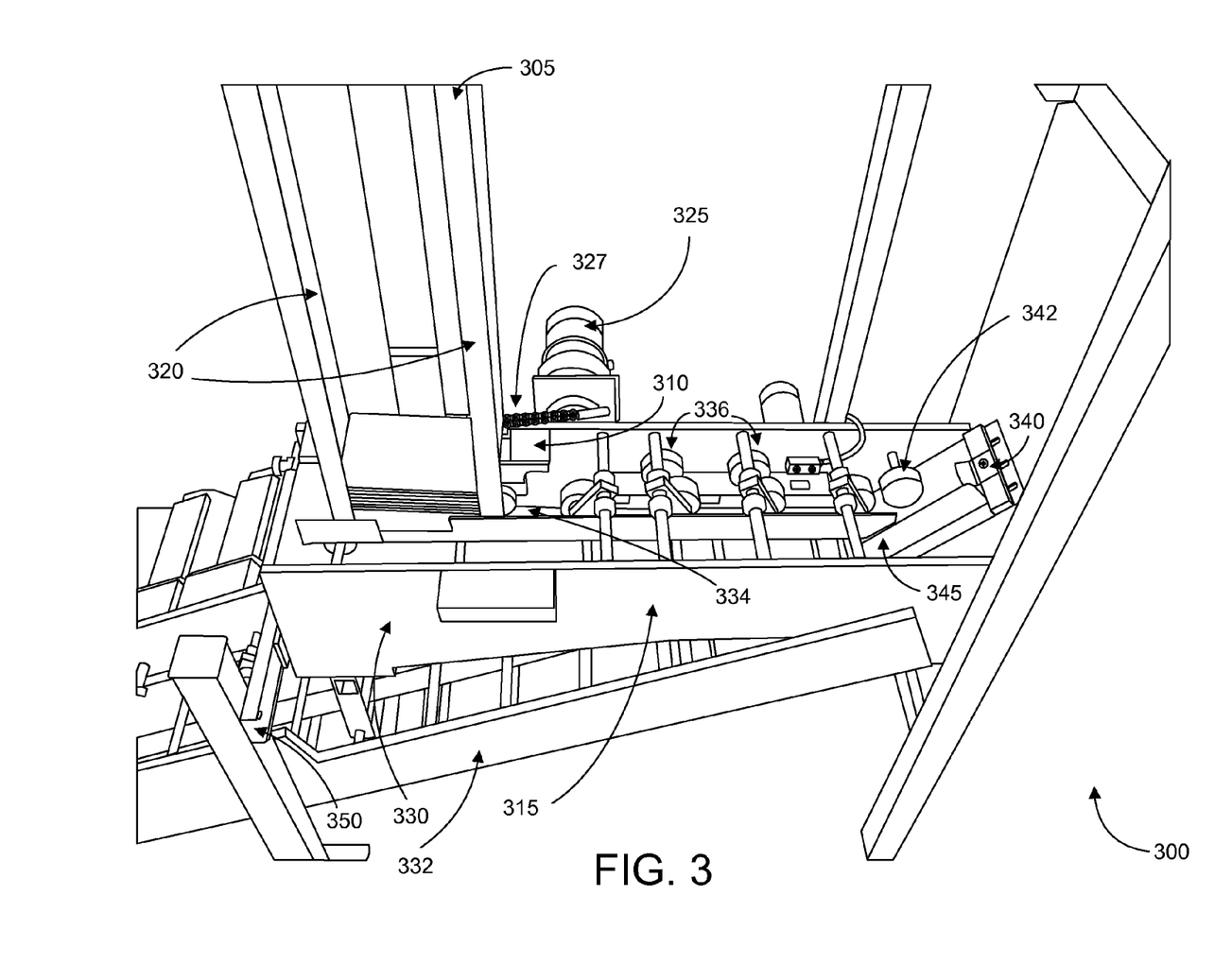
FIG. 3 is a front perspective view of an example payment card stager that may be utilized in accordance with various embodiments of the disclosure.
Figure 4:
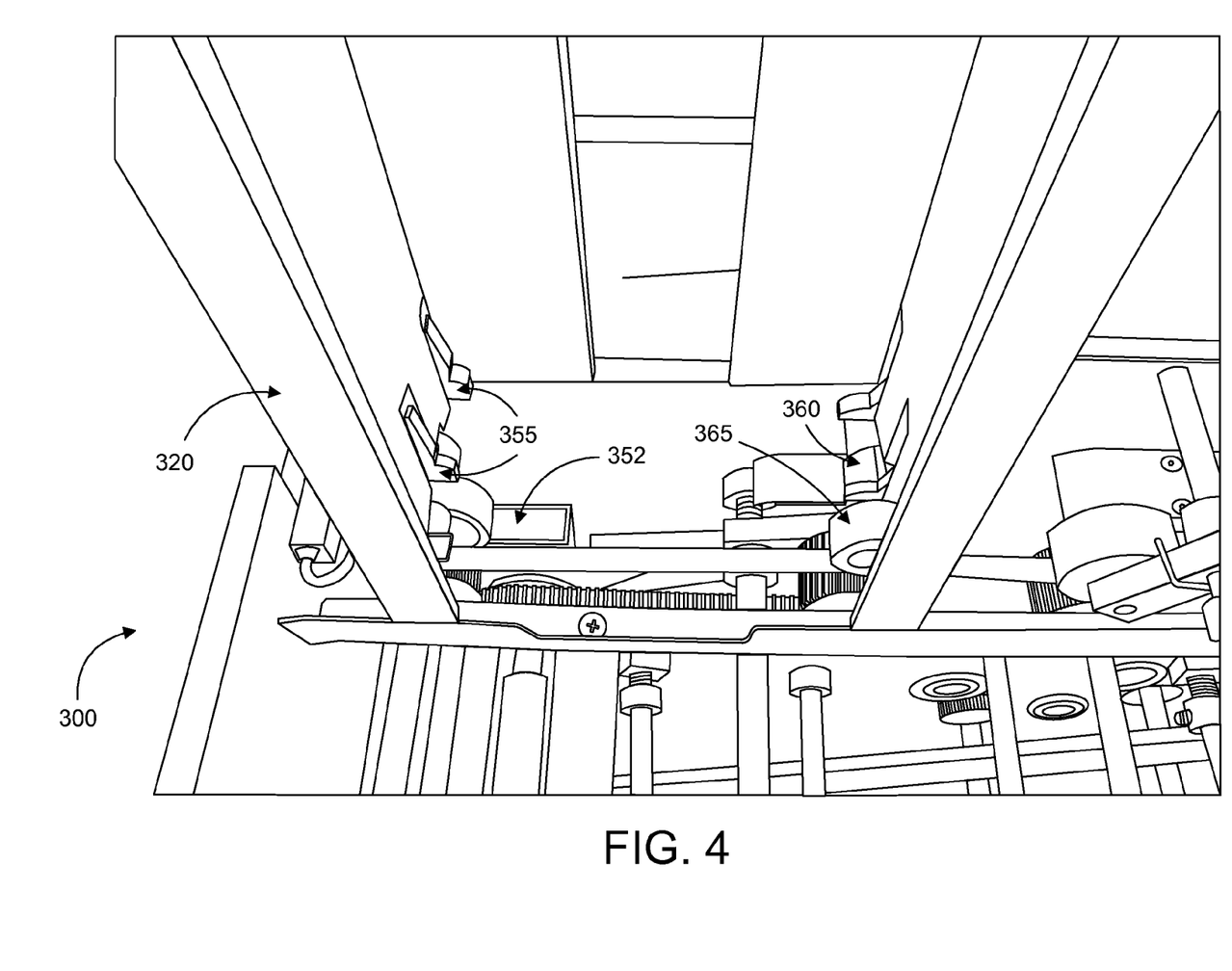
FIG. 4 is a top perspective view of an example payment card selector that may be utilized in accordance with various embodiments of the disclosure.
Figure 5:
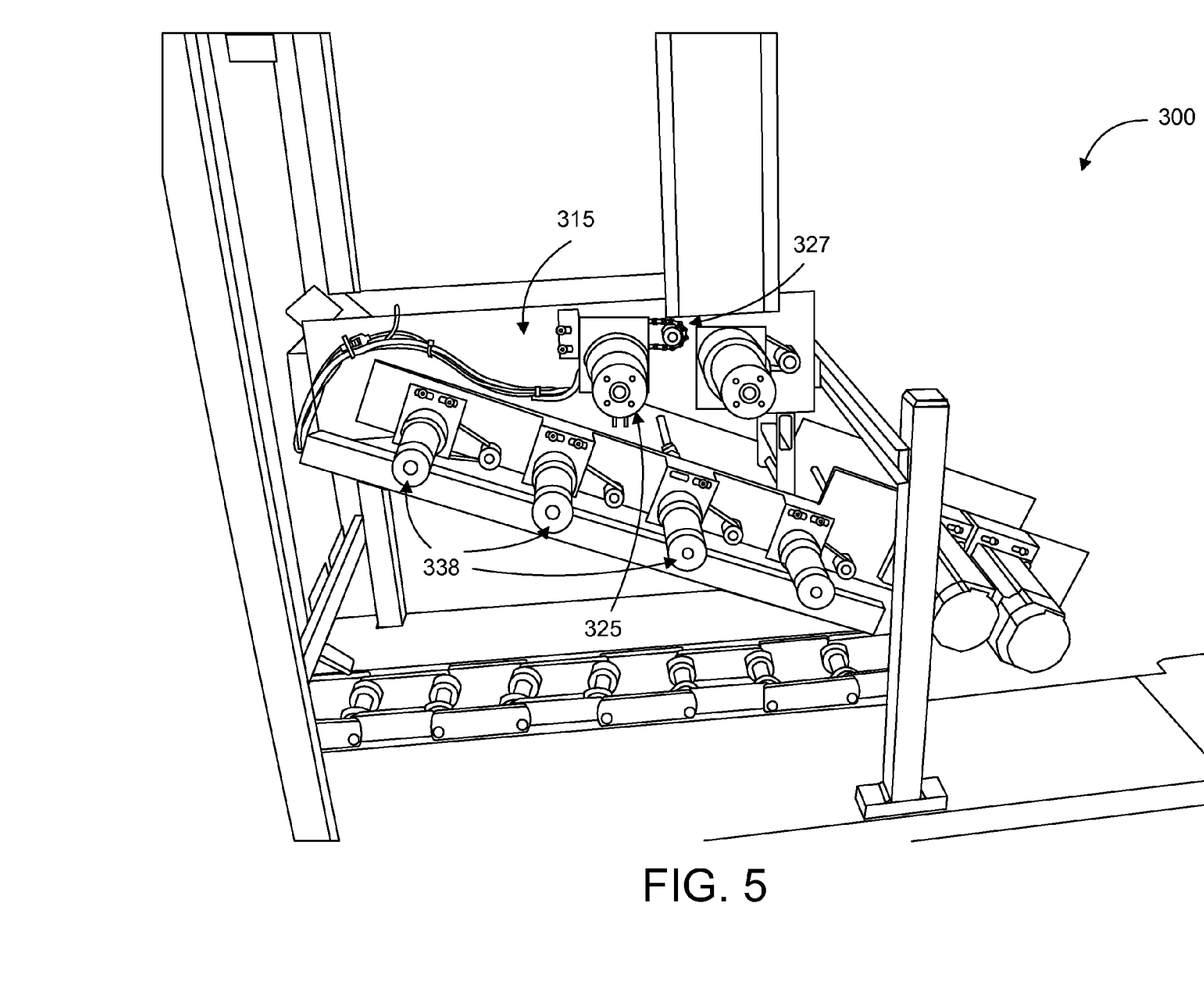
FIG. 5 is a rear perspective view of an example payment card stager that may be utilized in accordance with various embodiments of the disclosure.

FIGS. 3-5 illustrate an example payment card stager 300 that may be utilized in accordance with various embodiments of the disclosure. The illustrated card stager 300 may be incorporated into a suitable card merge machine, such as the machine 100 illustrated in FIG. 1. For example, the card stager 300 may be one example of the card staging component 115 described above with reference to FIG. 1.

FIG. 3 is a front perspective view of an example payment card stager 300 that may be utilized in accordance with various embodiments of the disclosure. The card stager 300 may include, among other components, a payment card supply 305, a card picker 310 or card selector, and a payment card track 315. The payment card supply 305 may be configured to provide a supply of payment cards to the card picker 310. For example, a stack of payment cards may be provided to the card picker 310. One or more guides 320 or brackets may be utilized to secure the stack of payment cards within the card supply 305.

The card picker 310 or card selector may be configured to select or pick a single payment card from the stack of payment cards. For example, the card picker 310 may be configured to select a bottom card from the stack. According to an aspect of the disclosure, the card may be a foldable payment card, and the card may be selected without folding the card. Once a payment card has been selected, the payment card may be provided to the payment card track 315. In certain embodiments, the card picker 310 may include a cam or other suitable device that is configured to pull or otherwise select a single payment card from the stack and provide the payment card to the track 315. The cam may be controlled by one or more suitable motors, such as a gear motor 325, and the cam may be configured to flex the payment card in a direction other than the direction of the fold included on the payment card. For example, the payment card may be flexed in a direction that is transverse to the direction of the fold. In this regard, the payment card may be forced under a suitable roller that pulls the payment card onto and/or along the track 315. The example card picker 310 is described in greater detail below with reference to FIG. 4.

The payment card track 315 may include a first portion 330 and a second portion 332. The first portion 330 may include a relatively flat portion, and the second portion 332 may include an inclined portion. The first portion 330 may receive a payment card from the card picker 310 and provide the payment card to the second portion 332. The second portion 332 may then provide the payment card to a form that is advanced along a separate track, such as the first track 120 illustrated in FIG. 1. The payment card track 315 may include one or more suitable belts, such as one or more timing belts 334, that are advanced by any number of pulleys. In this regard, one or more payment cards may be advanced along the track 315. Additionally or alternatively, any number of suitable rollers 336 may facilitate the advancement of cards along the track 315. The timing belt(s) 334 and rollers 336 may also facilitate the advancement of foldable payment cards in a relatively flat position such that foldable payment cards will not be folded. The operation of the timing belt(s) 334 and/or rollers 336 may be controlled by one or more suitable motors (element 338 of FIG. 5), such as one or more suitable servo motors. As desired in various embodiments, the motors 338 may be electronically geared and/or synchronized in a similar manner as the motors 225, 235, 250 discussed above with reference to FIG. 2. In this regard, the advancement of a payment card along the track 315 may be coordinated with the advancement of a corresponding form along a separate track such that the payment card will be supplied to an adhesive (e.g., a double-sided tape) that has been provided to the form.

In operation, a payment card may be advanced along the first portion 330 by a timing belt 334 and/or rollers 336 until the payment card makes contact with a return guide 340, such as a spring loaded return guide. As the payment card is advanced off of the first portion 330, the payment card may depress a spring within the return guide 340. The return action of the spring combined with a roller 342 that is configured to force the card downward may drive the payment card onto the second portion 332 via a gap between the first portion 330 and the second portion 332. The payment card may then be advanced along the inclined second portion 332 until it is provided to a corresponding form. For example, the payment card may be advanced along the second portion 332 until the payment card reaches the end of the second portion 332. The payment card may then fall off of the second portion 332 onto an adhesive that has been provided to a corresponding form that is advanced along a track 120 that is below the second portion 332. The payment card may then be pressed into the adhesive by one or more rollers associated with the track 120 on which the form is advanced. In this regard, the payment card may be provided to a form without the payment card being folded.

In certain embodiments, a suitable adhesive applicator may be configured to apply an adhesive, such as a double-sided tape or a liquid adhesive to the payment card as the payment card is advanced along the payment card track 315. The payment card with the applied adhesive may then be supplied by the payment card track 315 to the form, which may or may not include an applied adhesive. As desired, the payment card and the form may then be pressed together by one or more rollers associated with the track 120 on which the form is advanced.

In certain embodiments of the disclosure, one or more reader devices 345, such as magnetic stripe readers and/or RF readers may be associated with the payment card track 315. For example, one or more reader devices 345 may be incorporated into the track 315 near the return guide 340. As desired, redundant reader devices may be utilized. As a payment card is forced onto the second portion 332, the payment card may pass through the reader devices 345. In this regard, payment account information may be read from the payment card and provided to one or more controllers that are configured to determine whether the payment account information matches information that has been read from a corresponding form to which the payment card is attached.

Similar to the adhesive applicator 200 illustrated in FIG. 2, the card stager 300 may be mounted onto one or more suitable brackets 350 that facilitate the adjustment of the card stager 300 in a lateral or side-to-side direction. For example, a position of the card stager 300 may be adjusted along the length of the brackets 350. In this regard, the positioning of a payment card that is provided to a form that is advanced underneath the card stager 300 may be varied in a lateral direction. In certain embodiments, the brackets 350 may include slides or rails, and the positioning of the card stager 300 on the brackets 350 may be adjusted by sliding the card stager 300 along the slides. The card stager 300 may then be locked into place once a desired position is reached.

FIG. 4 is a top perspective view of an example payment card picker 310 or card selector that may be utilized in accordance with various embodiments of the disclosure. The card picker 310 may be configured to select a card from a stack of cards and provide the card to a payment card track 315 for advancement through a card stager 300. With reference to FIG. 4, the brackets 320 or guides of a card supply are illustrated without a supply of payment cards to facilitate the description of the card picker 310. One or more sensors 352, such as an optical sensor, may facilitate a determination of whether any payment cards are present within the card supply. Given the presence of a stack of payment cards (or a single card), a bottom card on the stack may rest against one or more posts 355 or extensions that extend from the brackets 320.

Additionally, the bottom card may be in contact with a cam 360 or disk. The cam 360 may be configured to pinch or catch a contacting edge of the payment card and force the payment card under a roller 365 that pulls or drives the payment card onto the payment card track 315. In certain embodiments, the cam 360 may include a slot or groove that is configured to receive an edge of a payment card. In operation, a downward motion of the cam 360 may flex the payment card around the roller 365 such that the payment card reaches a pinch point between the roller 365 and a timing belt 334 associated with the track 315. For a foldable payment card, the payment card may be flexed in a direction that is transverse to the direction of the fold. In this regard, the payment card may be picked and provided to the track 315 without folding the payment card.

The movement of the cam 360 may be controlled by a corresponding motor, such as the gear motor 325 discussed above with reference to FIG. 3. The motor 325 may control the movement of a chain (element 327 of FIG. 3) that is connected between the motor 325 and the cam 360. As the chain 327 is moved, the cam 360 may be moved up and down. As the cam 360 is moved down, the cam 360 may flex a payment card such that card is pulled onto the track 315 by the roller 365. As the cam 360 is moved up, the cam 360 may contact the next available payment card. In this regard, individual payment cards may be picked or selected from a supply of payment cards, and the individual payment cards may be provided to a payment card track 315.

FIG. 5 is a rear perspective view of an example payment card stager 300 that may be utilized in accordance with various embodiments of the disclosure. With reference to FIG. 5, the motors 338 that control the advancement of a payment card along the payment card track 315 are illustrated. Additionally, the motor 325 and chain 327 that control the operation of the cam 360 are illustrated.

As desired, embodiments of the disclosure may include a payment card stager 300 with more or less than the components illustrated in FIGS. 3-5. Additionally, a card stager may include alternative components. The card stager 300 of FIGS. 3-5 is provided by way of example only.

Figure 6:
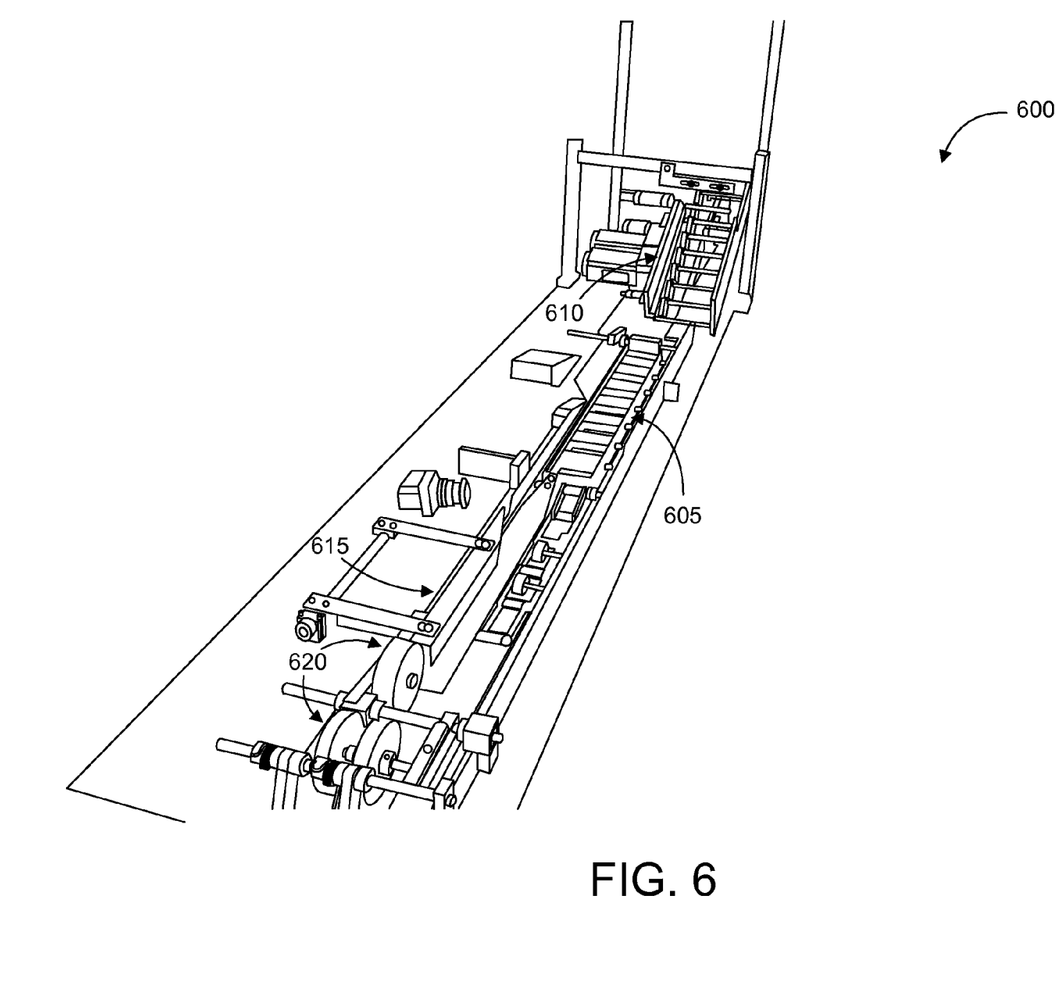
FIG. 6 is a top perspective view of example tracks that may be utilized in accordance with various embodiments of the disclosure.

FIG. 6 is a top perspective view of example tracks 600 that may be utilized in accordance with various embodiments of the disclosure. The illustrated tracks 600 may be incorporated into a suitable card merge machine, such as the machine 100 illustrated in FIG. 1. For example, the tracks 600 may be examples of the first track 120 and the second track 125 described above with reference to FIG. 1.

With reference to FIG. 6, a first track 605 may be configured to advance a form that is supplied to a merge machine 100. The first track 605 may include any number of belts (e.g., timing belts) and/or rollers that facilitate the advancement of one or more forms. The belts and/or rollers may be controlled by one or more suitable motors, such as one or more servo motors. In certain embodiments, the motors may be synchronized or coordinated. In this regard, the various components of the first track 605 may be electronically geared to one another and/or to components of a second track 610.

In operation, the first track 605 may receive a form from a form feeder, such as the form feeder 105 illustrated in FIG. 1, and the first track 605 may advance the form beneath an adhesive applicator and a card staging component, such as the adhesive applicator 110 and the card staging component 115 illustrated in FIG. 1. In this regard, an adhesive may be supplied to the form and a payment card may be supplied to the form such that the payment card contacts the adhesive. Once the payment card has been supplied to the form, the first track 605 may advance the form through one or more folding devices, such as a plow folder. As shown in FIG. 6, one or more plow fold guides 615 may be configured to fold a form, and one or more associated rollers 620 may be configured to crease the folded form. The folded form may then be passed over or by a suitable thickness sensor, such as the sensor 142 illustrated in FIG. 1, in order to determine whether a payment card has been attached to the form. The form may then be supplied to an output of the machine 100.

Any number of forms may be advanced along the first track 605 as desired in various embodiments of the disclosure. In certain embodiments, the maximum number of forms that may be advanced along the first track 605 may be determined based at least in part on the length of the first track 605. Additionally, although the first track 605 is illustrated as a relatively straight track, the first track 605 may include any number of curves or bends as desired in various embodiments of the disclosure.

The second track 610 may be configured to advance a payment card that is supplied to a merge machine 100. The second track 610 may include any number of belts (e.g., timing belts) and/or rollers that facilitate the advancement of one or more payment cards. The belts and/or rollers may be controlled by one or more suitable motors, such as one or more servo motors. In certain embodiments, the motors may be synchronized or coordinated. In this regard, the various components of the second track 610 may be electronically geared to one another and/or to components of the first track 605.

In operation, the second track 610 may receive a payment card from a suitable card picker, such as the card picker 310 illustrated in FIG. 3. The second track 610 may then advance the payment card through a card staging component, such as the card staging component 115 illustrated in FIG. 1. In this regard, payment account information may be read from the payment card to facilitate a comparison to payment information read from a corresponding form. According to an aspect of the disclosure, the second track 610 may include an inclined portion that is configured to supply a payment card to a form that is advanced along the first track 605. For example, the inclined portion may be positioned above the first track 605, and a card may be advanced along the inclined portion until it advanced off of an edge of the inclined portion and onto a form that is positioned on the first track 605. According to an aspect of the disclosure, the payment card may be advanced along the second track 610 without the payment card being folded.

Any number of payment cards may be advanced along the second track 610 as desired in various embodiments of the disclosure. In certain embodiments, the maximum number of payment cards that may be advanced along the second track 610 may be determined based at least in part on the length of the second track 610. In one example embodiment, approximately five to seven cards may be advanced along the second track 610 at any given time during the operation of the machine 100. For example, six cards may be positioned on the second track 610 and a seventh card may be positioned within a return guide associated with the second track 610.

As desired, embodiments of the disclosure may include tracks 600 with more or less than the components illustrated in FIG. 6. For example, a track may additionally include one or more components that are configured to stuff or supply forms to envelopes and/or mailers. Additionally, one or more tracks may include alternative components. The tracks 600 of FIG. 6 are provided by way of example only.

Figure 7:
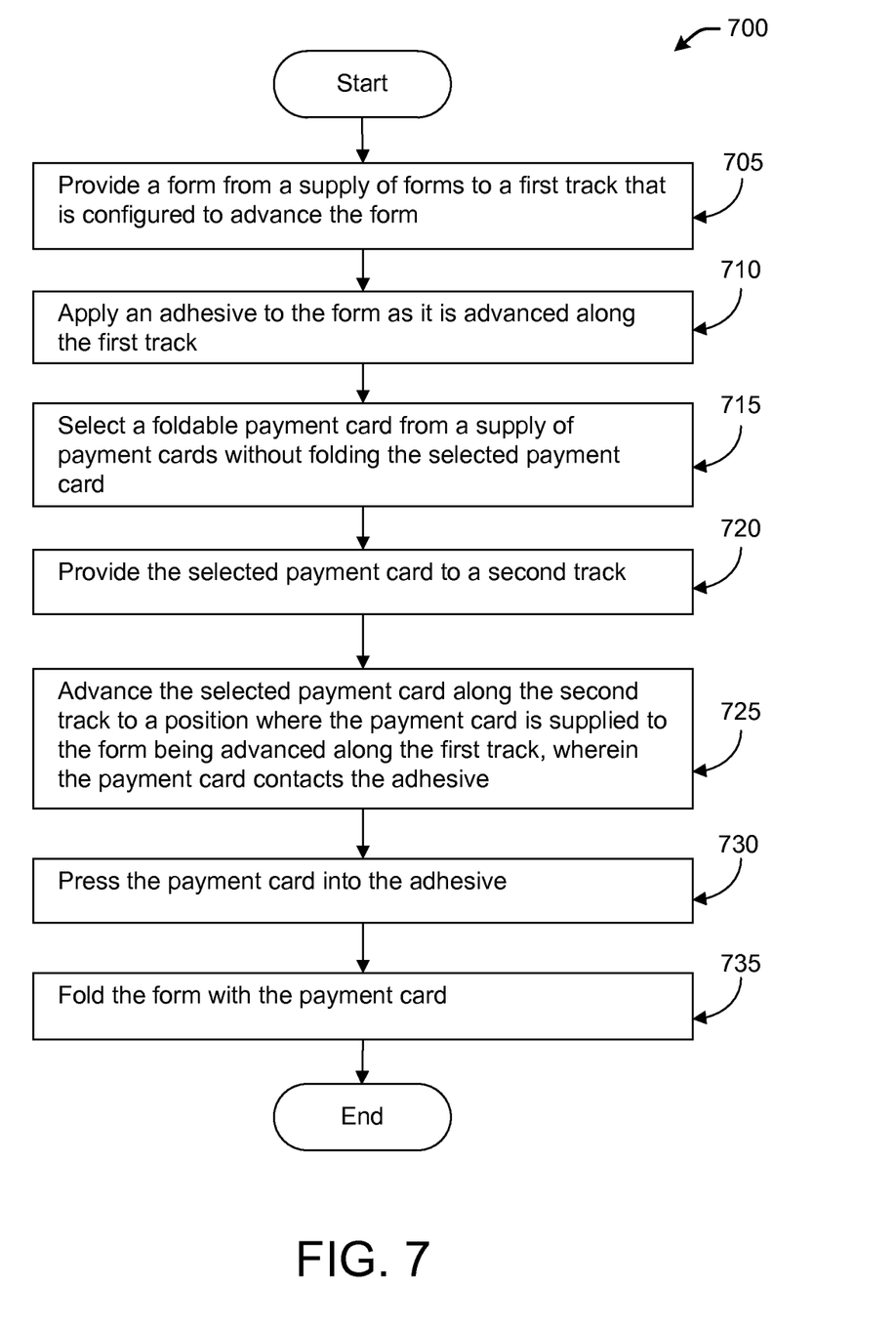
FIG. 7 is a flowchart of an example method for merging a payment card and a form, according to an illustrative embodiment of the disclosure.

FIG. 7 is a flowchart illustrating one example method 700 for merging payment cards and forms, according to an example embodiment of the disclosure. The method may be performed by and/or utilized in association with a suitable card merge machine, such as the machine 100 illustrated in FIG. 1. The method 700 may begin at block 705.

At block 705, a form may be provided from a supply of forms to a first track that is configured to advance the form through a card merge machine 100. As desired, a form may be provided to a first track utilizing any number of suitable form feeder devices, such as the form feeder 105 described above with reference to FIG. 1. According to an aspect of the disclosure, individual forms may be provided to the first track. Additionally, as desired, data such as payment account information may be read from the form either prior to the form being provided to the first track or after the form has been provided to the first track.

At block 710, an adhesive may be applied or provided to the form as the form is advanced along the first track. For example, the form may be advanced along the first track below a suitable adhesive applicator, such as the adhesive applicator 110 illustrated in FIG. 1, and the adhesive applicator 110 may apply an adhesive to the form. A wide variety of suitable types of adhesive may be applied to the form as desired in various embodiments of the disclosure, such as double-sided tape or a liquid adhesive. Additionally, as desired in certain embodiments, adhesive may be applied to multiple areas of the form. As an alternative to or in addition to applying an adhesive to the form, an adhesive may be applied to a payment card prior to the payment card being supplied to the form.

At block 715, a payment card, such as a foldable payment card, may be selected or picked from a supply of payment cards. For example, a suitable card picker, such as the card picker 310 illustrated in FIG. 4, may be configured to select a payment card from a stack or other supply of payment cards. According to an aspect of the disclosure, a foldable payment card may be selected or picked without folding the payment card. For example, the payment card may be selected by flexing the payment card in a direction that is transverse to the direction of the fold, thereby facilitating the selection of the payment card without folding the card. The selected payment card may then be provided to a second track at block 720.

At block 725, the selected payment card may be advanced along the second track to a position in which the payment card is supplied or provided to the form being advanced along the first track. For example, the second track may be positioned at least partially above the first track, and the second track may include an inclined portion that is configured to provide the payment card to the form on the first track. The payment card may be advanced off of the end of the second track such that the payment card makes contact with the adhesive that has been provided to the form positioned below the second track on the first track. According to an aspect of the disclosure, the payment card may be advanced along the second track such that the payment card is not folded by the second track.

In certain embodiments, payment account information included, stored, embedded, or programmed onto the payment card may be read by one or more suitable readers (e.g., magnetic stripe readers, RF readers, etc.) as the payment card is advanced along the second track. In this regard, the payment account information included on the payment card may be compared to corresponding information included on a form to which the payment card will be provided. The comparison may facilitate a determination as to whether the payment card matches a form to which the payment card is merged. If it is determined that the payment card and form do not match, then the payment card and form may be diverted or routed to a suitable divert or rejection bin as desired.

At block 730, the payment card may be pressed into the adhesive, thereby facilitating and/or enforcing a bond between the payment card and the form. For example, the payment card and the form may be passed through one or more suitable rollers that are configured to press the payment card into the adhesive.

At block 735, which may be optional in certain embodiments of the disclosure, the form may be folded one or more times after the payment card has been attached to the form. For example, the form may be processed by one or more suitable folding devices, such as a plow folder, that are configured to fold the form. In this regard, the form may be prepared for mailing to a customer desiring to use the payment card.

The method 700 may end following block 735.

In certain embodiments, certain operations of the method 700 may be coordinated, controlled, and/or performed by one or more suitable controllers and/or control units, such as the controller 150 illustrated in FIG. 1. For example, the controller 150 may facilitate the synchronization and/or coordination of the advancement of the form along the first track and the advancement of the payment card along the second track. In certain embodiments, the controller 150 may control the synchronization or coordination of one or more motors that facilitate the advancement of the first track and the second track. However, as desired in certain embodiments, the various motors may additionally or alternatively include their own control logic and/or programmable instructions that facilitate the coordination of the motors. Additionally, in certain embodiments, the controller 150 or a separate controller may be configured to receive information read from the form and information read from the payment card. The controller 150 may then be configured to compare the received information in order to determine whether the payment card matches the form.

The operations described and shown in the method 700 of FIG. 7 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 7 may be performed.

The disclosure is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method, comprising:
    providing a form from a first supply of forms to a first track that is configured to advance the form;
    applying an adhesive to the form as it is advanced along the first track;
    selecting a foldable payment card from a second supply of foldable payment cards, wherein the selection of the payment card does not result in the payment card being folded;
    advancing the selected payment card, without folding the payment card, along a second track to a position in which the payment card is supplied to the form and contacts the adhesive; and
    applying an adhesive to one of (i) the form as the form is advanced along the first track or (ii) the payment card as the payment card is advanced along the second track, wherein the adhesive is configured to attach the payment card to the form once the payment card is supplied to the form,
    wherein the advancement of the first track and the second track is controlled by at least one computer.

2. The method of claim 1, further comprising:
    reading first payment account information from the form;
    reading second payment account information from the payment card; and
    determining whether the first payment account information matches the second payment account information.

3. The method of claim 1, wherein providing a form comprises providing one of a paper form or a post card.

4. The method of claim 1, wherein applying an adhesive comprises applying a double-sided tape.

5. The method of claim 1, wherein advancing the selected payment card along a second track comprises advancing the payment card along an inclined track that drops the payment card onto the form.

6. The method of claim 1, wherein selecting a payment card comprises flexing the payment card in a direction that is transverse to the direction of a fold of the payment card.

7. The method claim 1, further comprising:
    folding the form subsequent to the supply of the payment card to the form.

8. A method, comprising:
    advancing a form along a first track;
    selecting a foldable payment card from a supply of foldable payment cards, wherein the selection of the payment card does not result in the payment card being folded;
    advancing the selected payment card along a second track without folding the payment card;
    applying an adhesive to one of (i) the form as the form is advanced along the first track or (ii) the payment card as the payment card is advanced along the second track; and
    providing the payment card, via the second track, to the form as the form is advanced along the first track;
    wherein the advancement of the first track and the second track are controlled by at least one computer.

* * * * *